Dec. 24, 1929.                C. L. KELLERT                1,740,603
                             LIGHT COLOR SCREEN
                          Filed Nov. 20, 1928         2 Sheets-Sheet 1
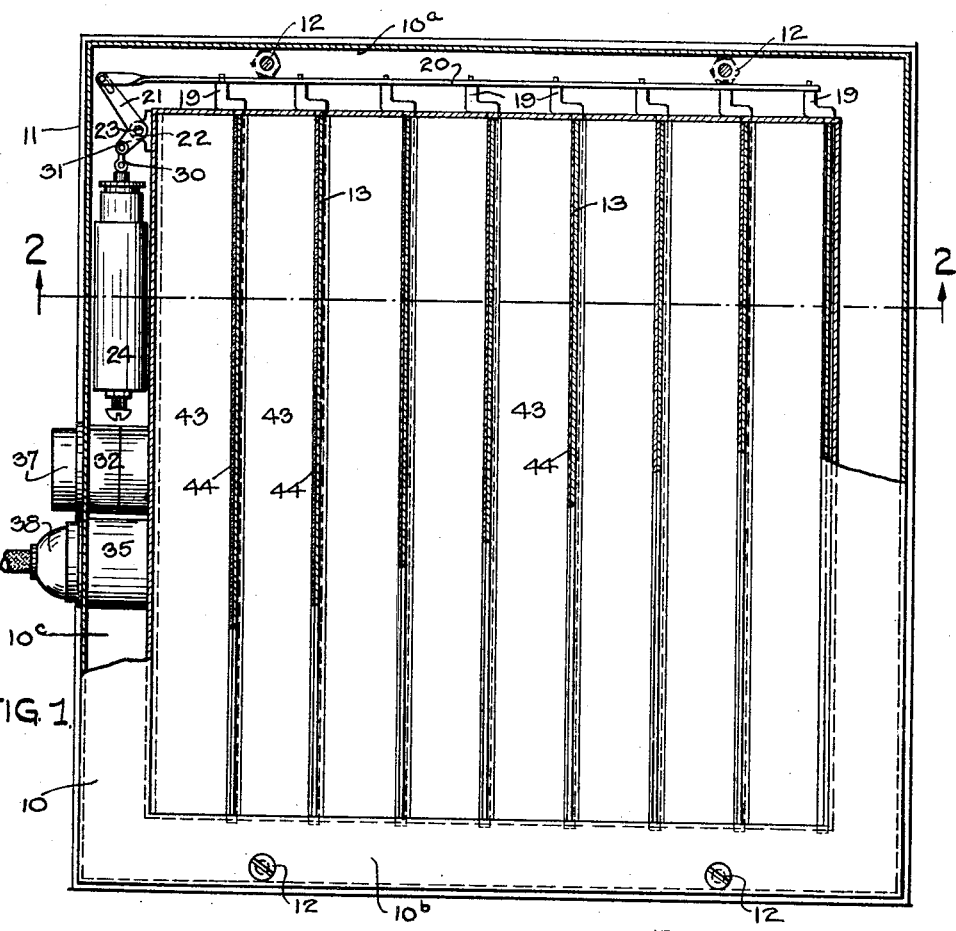
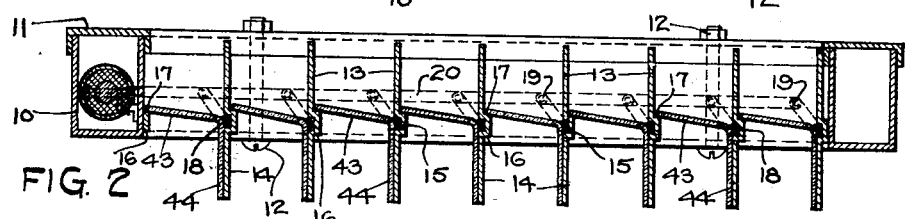
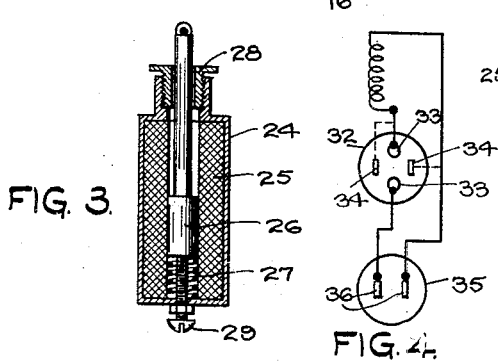
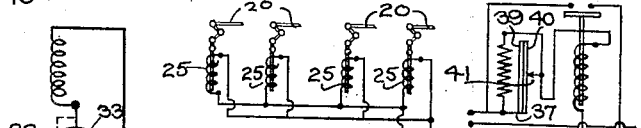
INVENTOR.
CHARLES L. KELLERT.
BY Leon Edelson
ATTORNEY.

Dec. 24, 1929.　　　C. L. KELLERT　　　1,740,603
LIGHT COLOR SCREEN
Filed Nov. 20, 1928　　　2 Sheets-Sheet 2

INVENTOR.
CHARLES L. KELLERT.
BY Lea Edelson
ATTORNEY.

Patented Dec. 24, 1929

1,740,603

UNITED STATES PATENT OFFICE

CHARLES L. KELLERT, OF BALTIMORE, MARYLAND

LIGHT COLOR SCREEN

Application filed November 20, 1923. Serial No. 320,603.

This invention relates to lighting devices, and more particularly to a light color screen adapted to project different colored lights upon an object to be illuminated.

Among the principal objects of this invention is the provision of a light color screen having a series of plates, each of which latter is composed of two sections of different color, means being provided for intermittently positioning the plates such that all of the sections thereof of one color and then all of those of the other color are brought into operative position before a relatively stationary light source.

A further object of the invention is the provision of a two-color light screen which is arranged for use in connection with different types of light projectors without necessitating changes in either the screen or projector.

A still further object of the invention is the provision of a light color screen which consists generally of a frame wherein are housed a plurality of lenses of substantially right angular form in combination with an actuating mechanism for automatically and in unison shifting said lenses into one position or another.

A still further object of the invention is the provision of a plurality of lenses each of which is arranged for pivotal movement about an axis extending longitudinally of the lenses, the lenses being each further provided with two portions of different color through either of which light may be projected depending upon the position assumed by the lens, in combination with an intermittently operated mechanism for simultaneously shifting the several lenses such that the similarly colored portions thereof alternately lie in a common vertical plane disposed in advance of the light source.

A further object of the invention is the provision of a light color screen which is simple and inexpensive in construction, which is capable of being readily applied to practically any standard form of light projector that is now in general use, and which is arranged to automatically produce a light first of one color and then of another for alternate projection upon the object or objects to be illuminated.

Still another object of the invention is the provision of a pivotally mounted lens having portions thereof extending at right angles to each other, the lens being so arranged relative to a light source that first one and then the other of said portions thereof serve to transmit the light rays emanating from said source.

Other objects of the invention and advantages thereof will appear more fully hereinafter.

The invention consists substantially in the construction, combination, location and relative arrangement of parts, all as will be more fully set forth hereinafter, as shown in the accompanying drawings, and as finally pointed out in the appended claims.

In the accompanying drawings:

Figure 1 is a front elevation of the light color screen constructed in accordance with this invention, the upper portion thereof being broken away to show the operating mechanism therefor;

Figure 2 is a horizontal sectional view taken on the line 2—2 of Figure 1;

Figure 3 is a vertical sectional view of the electro-magnet or solenoid;

Figure 4 is a diagrammatic view showing the connections between the thermostat and electro-magnet connected as shown in Figure 1;

Figure 5 is a diagrammatic view of the electric connections when a battery of screens are to be operated from a single thermostat;

Figure 7:
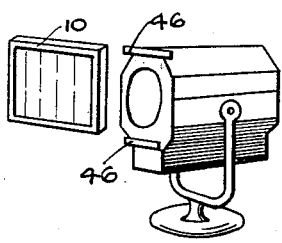
Figures 7 to 11, inclusive, are perspective views showing the manner of attaching the light color screens to various standard forms of light projectors.
Figure 8:
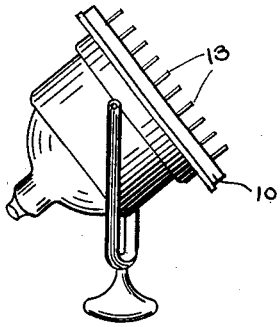
Figure 9:
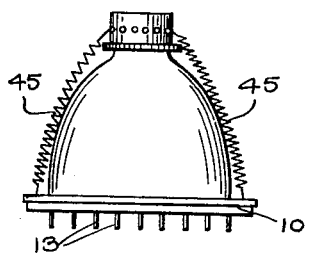

Referring now more particularly to the drawings, it will be seen that the invention consists of a frame member 10, the top, bottom and side sections of which are preferably of channel cross-section presenting rearwardly. Overlying the open sides of these channel-shaped sections of the frame member 10 is a removable cover member 11 corresponding in shape to that of the frame member and secured thereto by suitable attaching elements, such as the screws or bolts 12. When the cover 11 is secured in place upon the frame member 10 there is provided in effect an open frame having top, bottom and side walls of hollow cross-section.

Interconnecting the top and bottom sections 10$^a$ and 10$^b$ of the frame are a plurality of fixed uniformly spaced vertically extending plates 13 having portions 14 thereof projecting exteriorly of the plane of the front face of the frame. The rear edges of these plates terminate short of the plane of the rear face of the frame. Each plate is provided in one surface thereof and immediately within the forward face of the frame with a vertically extending groove or depression 15 which forms in the opposite surface of the plate a pair of vertically extending shoulders 16—17. The plates 13 may be formed integrally with the frame member 10 or they may be separately secured thereto as may be desired.

Figure 6:
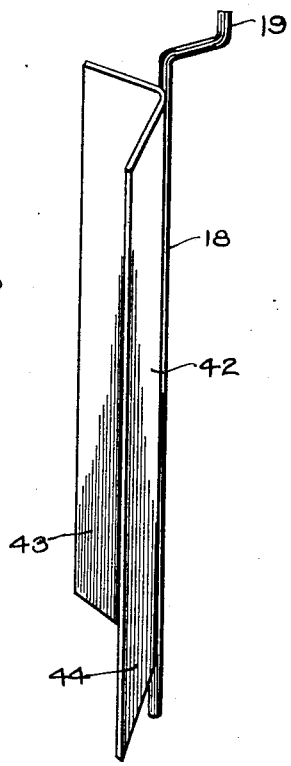
Figure 6 is a perspective view of a preferred form of construction of one of the light transmitting elements.
Figures 10, 11:
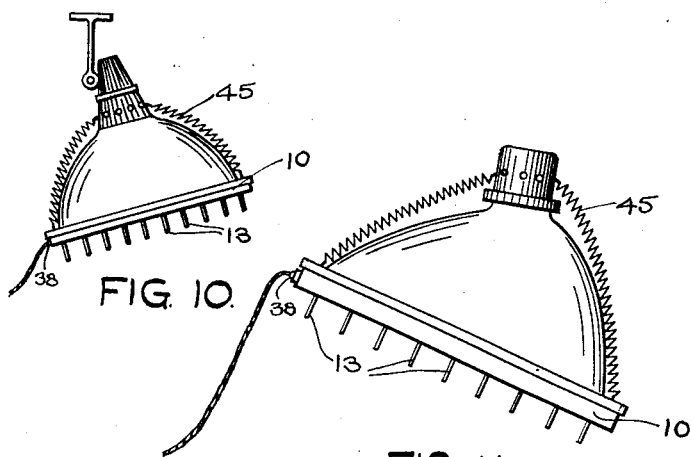

Disposed within each of the vertically extending grooves 15 is a vertically arranged spindle 18, the top and bottom ends of which are respectively journalled in suitable bearings provided in the top and bottom sections of the frame member 10. As appears most clearly in Figure 6 the upper end of each spindle 18 is provided with an offset portion 19 arranged within the channeled upper section 10$^a$ of the frame member 12. This offset portion 19 may be formed as an integral prolongation of the spindle 18 or it may take the form of a separate link member fixedly secured to the upper free end of the spindle. Interconnecting the offset portions 19 of the several spindles is a horizontally extending rod 20 which is arranged for reciprocable movement within the upper channeled section of the frame member 10. The free end of this rod 20 terminates short of the side section 10$^c$ of the frame and is pivotally connected to one arm 21 of a bell-crank lever 22, the latter being pivotally secured upon the frame as at 23.

Suitably mounted within the channeled side section 10$^c$ of the frame is a solenoid designated generally by the reference numeral 24. This solenoid includes a coil 25 surrounding a plunger 26 which latter is designed to be drawn downwardly upon energization of the coil 25. Interposed between the lower end of the plunger 26 and the bottom wall of the solenoid casing is a compression spring 27 which functions to force the plunger upwardly when the coil 25 is deenergized. A bushing 28 is threadedly received within the upper end of the solenoid casing and operates to prevent the plunger 26 from moving upwardly by the action of the spring 27 beyond a predetermined point. A screw 29 threaded into the bottom wall of the solenoid casing serves to limit the downward movement of the solenoid. Both the bushing 28 and the screw 29 are adjustable so that the stroke of the plunger 26 may be varied within certain predetermined limits. A stem or link 30 interconnects the upper end of the plunger 26 with the free end of the arm 31 of the bell crank lever 22 whereby movement of the plunger is transmitted to the reciprocating rod 20.

It will thus appear that when the solenoid coil 25 is energized to an extent sufficient to draw the plunger 26 downwardly this horizontally arranged rod 20 will be drawn to the left with the result that all of the spindles 18 will be oscillated in counter-clockwise direction. Conversely, when the solenoid coil becomes denergized the plunger 26 will be forced upwardly by the action of the spring 27 and in so doing will cause the spindles to rotate in a clockwise direction.

Arranged immediately below the solenoid 24 is a combination plug receptacle 32 having two pairs of terminals 33 and 34. A second plug receptacle 35 is arranged below the receptacle 32 and is provided with a pair of terminals 36. One of the terminals 33 of the receptacle 32 is electrically connected to a terminal of the solenoid coil 25 while the remaining terminal 33 is connected to one of the terminals 36 of the receptacle 35. The remaining terminal of this latter receptacle is in turn connected to the other terminal of the solenoid coil. The combination receptacle 32 is adapted to receive either a thermostat 37 or an ordinary plug connector 38. When the former is used the terminals thereof are electrically connected to the terminals 33 of the combination receptacle, while when the latter is used the terminals thereof are connected to the terminals 34 of the receptacle. Figure 1 shows a thermostat 37 inserted in the receptacle 32 and the usual plug connector 38 inserted in the receptacle 35. As so shown, it will be apparent that the thermostat is connected in series with the solenoid 24. This arrangement is shown diagrammatically in Figure 4.

As clearly appears in Figure 4, the terminals 34 of the combination receptacle 32 are respectively connected to the terminals of the solenoid 24 so that when the plug connector 38 is removed from the receptacle 35 and inserted in the receptacle 32 in place of the thermostat 37 a direct connection will be afforded between the plug connector and the solenoid. This latter arrangement is provided so that it may be possible to control the operation of a battery of color screens through a single thermostat. Such an arrangement is shown diagrammatically in Figure 5.

The thermostat 37, which may be of any usual form, generally consists of two bars 39 and 40 of material having dissimilar heat coefficients, these bars being secured together in such manner that when heated they bend toward and so contact with a fixed contact 41 to thereby close the electrical circuit leading to the solenoid. Conversely, when the bars cool, this circuit is opened and the solenoid is deenergized. By means of this thermostat, current is intermittently supplied to the solenoid with the result that the latter is alternately energized and denergized. This alternate energization and deenergization, as explained above, results in the rotation of the several spindles 18 first in one direction and then in the opposite direction.

Mounted upon each of the spindles 18 is a vertically arranged light transmitting member 42 formed of any suitable transparent or translucent material. As appears most clearly in Fig. 6 this member 42 is of generally angular form having the diverging panels 43 and 44. The spindle 18 for each member 42 is secured in any suitable manner to the meeting edges of the panels 43—44. Preferably, these panels form an angle with each other slightly greater than 90 degrees, this for a reason which will be apparent immediately hereinafter. Where the member 42 is of glass it is preferable to form the panels 43 and 44 thereof integral with each other. In certain instances, however, it may be desirable to employ a light transmitting member of celluloid, isinglass or other such material less rigid than glass and in such cases a metallic rim frame may be employed within which these non-rigid panels may be inserted. This metallic frame serves not only as a reinforcement for the more or less non-rigid panels but it also may constitute the supporting medium for a pair of vertically spaced pintles preferably formed integrally therewith.

Irrespective of whether the light transmitting members be formed of glass or less rigid transparent or translucent material, the several members 42 are pivotally supported within the frame member 10 in the manner shown best in Figures 1 and 2. With the solenoid 24 deenergized and the rod 20 shifted toward the right, the panels 43 of the several members 42 lie flat against the interior portions of the plates 13, while the panels 44 extend across the several openings provided between these plates. In this position of the light transmitting members 42, the panels 44 thereof are disposed with their free vertical edges abutting the shoulders 16 formed in the plates 13. When the solenoid is energized so that the rod 20 is shifted toward the left, the light transmitting members are rotated about an angle of approximately ninety degrees so that the panels 43 thereof lie with their free vertical edges abutting the shoulders 17 of the plates 13, while the panels 44 lie flat against the exterior portions 14 of said plates 13.

The mechanism for effecting alternate rotation of the spindles 18 first in one direction and then in the opposite direction has already been described, and inasmuch as the members 42 are suitably fixed to these spindles it will be apparent that these latter members will likewise be alternately rotated in consequence of which the several panels 43 and 44 alternately assume light transmitting positions. In order to obtain a multi-colored light effect, the panels 43 are all one color, say red, while the panels 44 are of another color, say blue. It will thus appear that upon energization of the solenoid 24 all of the red colored panels 43 assume a light transmitting position with the result that a red light will be projected upon the article to be illuminated. Subsequent deenergization of the solenoid causes the red colored panels 43 to move out of and the blue colored panels 44 to move into light transmitting position with the result that a blue light will be projected upon the article to be illuminated. This alternate projection of these different colored lights is continuous and entirely automatic.

Of course, the invention is not limited to the use of only these two colors. The light transmitting panels 43 and 44 may be of any desired colors, or they may be clear glass panels adapted to be painted any colors desired by the user of the device. The light color screen as herein described may be employed in connection with any of the many different forms of light projectors now available. Figures 7 to 10 show several standard forms of projectors equipped with my improved light color screen. It will be understood, of course, that the screen is positioned over the frontal face of the reflector with the exterior portions 14 of the plates 13 projecting forwardly and away from the light source. In certain forms of projectors it is preferable to mount the screen in position by means of a plurality of peripherally spaced spring members 45, the opposite ends of which are suitably quick-detachably secured to the screen and to the projector. See Figures 9 to 11. In other instances, the light projector is provided in its frontal face with a pair of opposed channels or guides 46 within which the screen is slidably inserted. See Figure 7.

It will be understood, of course, that various changes may be made from time to time without departing from the general spirit or principles of the invention and it is intended, therefore, to claim the invention broadly, as well as specifically, as indicated by the appended claims.

What is claimed as new and useful is:

1. In a device of the character described, in combination, a light projector, a frame adapted to be mounted over the frontal face of said projector, a plurality of two-color light transmitting members pivotally supported within said frame, and means for automatically oscillating said members whereby to alternately project different colored lights from the projector.

2. In a device of the character described, in combination, a light projector, a frame adapted to be positioned over the frontal face of said projector, a plurality of light transmitting members pivotally supported within said frame, each of said members being provided with a pair of angularly arranged panels, and means for automatically oscillating said members whereby to alternately position one set and then the other set of panels in light transmitting position.

3. In a device of the character described, a frame, a plurality of light transmitting members oscillatably mounted within said frame, said members each including a pair of angularly disposed panels of different colors, and means for alternately positioning the panels of one color and then those of another color in a common plane for transmitting the rays of light emanating from a light source.

4. In a device of the character described, a frame, a light transmitting member pivotally supported within said frame, said member including a pair of angularly disposed panels, and means for automatically oscillating said member whereby to alternately shift said panels into light transmitting position.

5. In a device of the character described, a frame adapted to be fitted over the frontal face of a light projector, a plurality of light transmitting members pivotally mounted within said frame, each of said members including a pair of angularly arranged panels, and means for oscillating said members into one or another position whereby to alternately shift the corresponding panels of said members into a common plane disposed in advance of and extending transversely with respect to a source of light.

6. In a light color screen of the character described, a plurality of light transmitting members having angularly disposed panels, and means for automatically shifting said members such that when certain of said panels lie in a common plane the remaining panels extend in a direction normal to said plane.

7. In a light color screen of the character described, a plurality of light transmitting members having angularly arranged panel sections, said members being oscillatably mounted for alternate rotation in opposite directions, and means for automatically effecting said alternate rotation such that when certain of said panels lie in a common plane the remaining panels project in a direction normal to said plane.

8. In a light color screen of the character described, an open frame member, a plurality of light transmitting members having angularly disposed panels pivotally supported in said frame, and means for effecting oscillation of said light transmitting members whereby to alternately position the opposite panels thereof in the plane of the frontal face of said frame member.

9. In a light color screen of the character described, an open frame member, a plurality of uniformly spaced parallel opaque plates interconnecting opposite sides of said frame member, said plates extending partially interiorly and partially exteriorly of the frontal face of said frame member, a light transmitting member having a pair of angularly disposed branches pivotally mounted in said frame between adjacent pairs of said plates, the pivotal axes of said light transmitting members being substantially coincident with the meeting edges of the angular branches thereof and disposed in close proximity to like surfaces of said opaque plates, and means for automatically and simultaneously oscillating said light transmitting members about said axes whereby to present first one branch and then the opposite branch of each of said light transmitting members in a position extending transversely between adjacent pairs of said opaque plates.

10. In a light color screen of the character described, a frame, a plurality of parallelly disposed opaque plates extending between opposite sides of said frame, said plates having portions projecting exteriorly of the frontal face of said frame, a plurality of light transmitting members respectively disposed between adjacent pairs of said plates, said members each including a pair of angularly disposed panels, means for supporting each of said members for oscillation about an axis substantially coincident with the meeting edges of the panels thereof, and means for oscillating said members in unison whereby to alternately shift the opposite panels of each light transmitting member into positions extending transversely between adjacent pairs of said opaque plates.

11. The combination with a frame having a series of openings, a pair of diverging light transmitting members associated with each opening, means for alternately framing the respective members in each of the several openings, and means for rendering the unframed member opaque to light transmission during the framed position of the other member.

In testimony whereof, I have hereunto affixed my signature.

CHARLES L. KELLERT.